J. F. TILLEY & S. B. AUSTIN.
DISPLAY APPARATUS FOR PRODUCING MOTION PICTURE EFFECTS.
APPLICATION FILED FEB. 13, 1914.
1,178,461.
Patented Apr. 4, 1916.
4 SHEETS—SHEET 3.
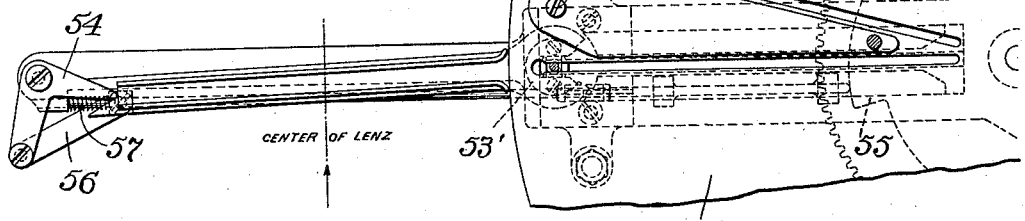
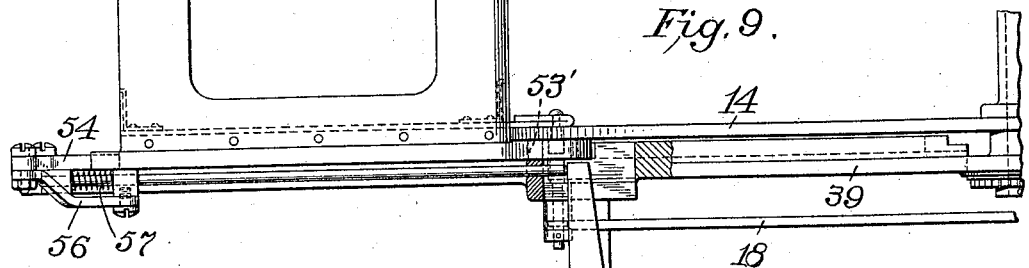
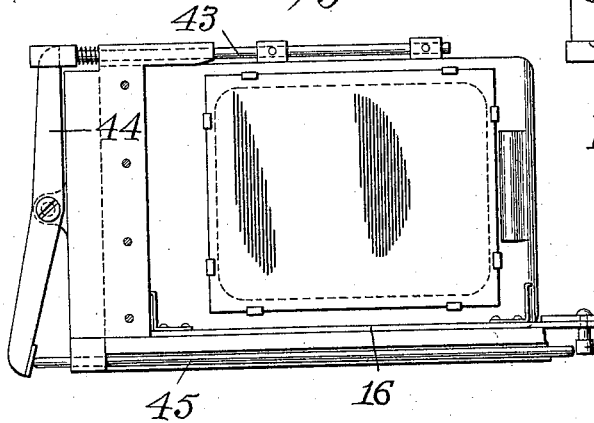
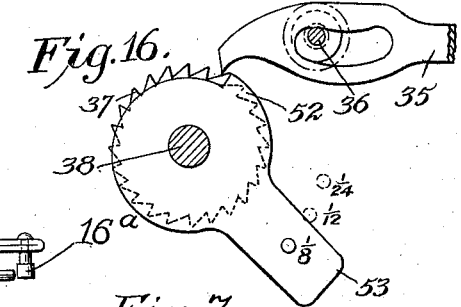
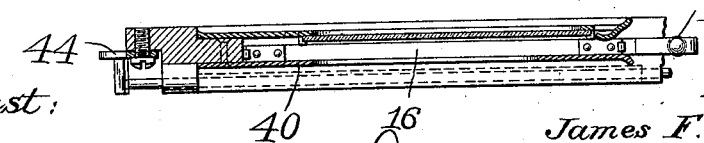

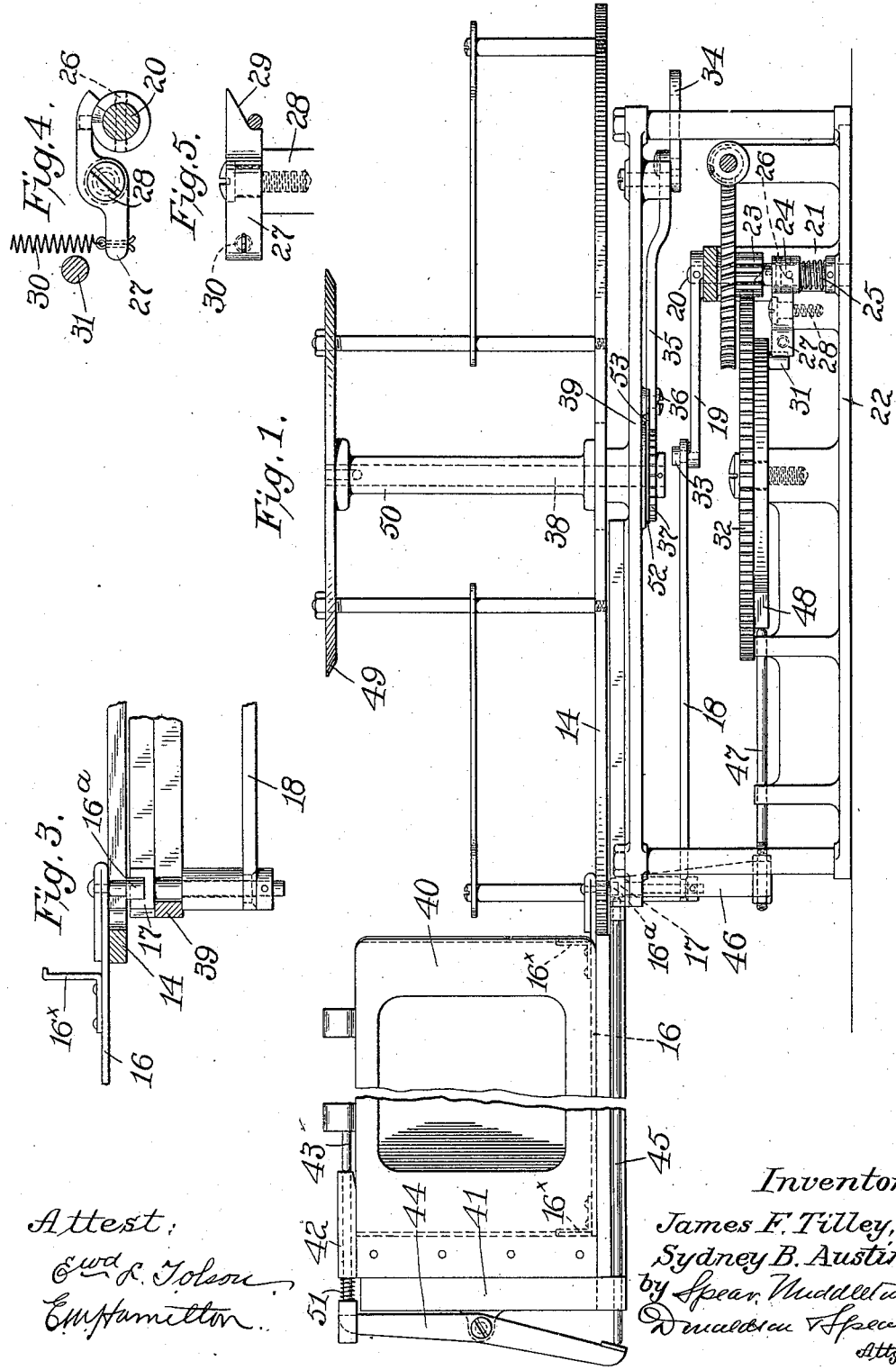

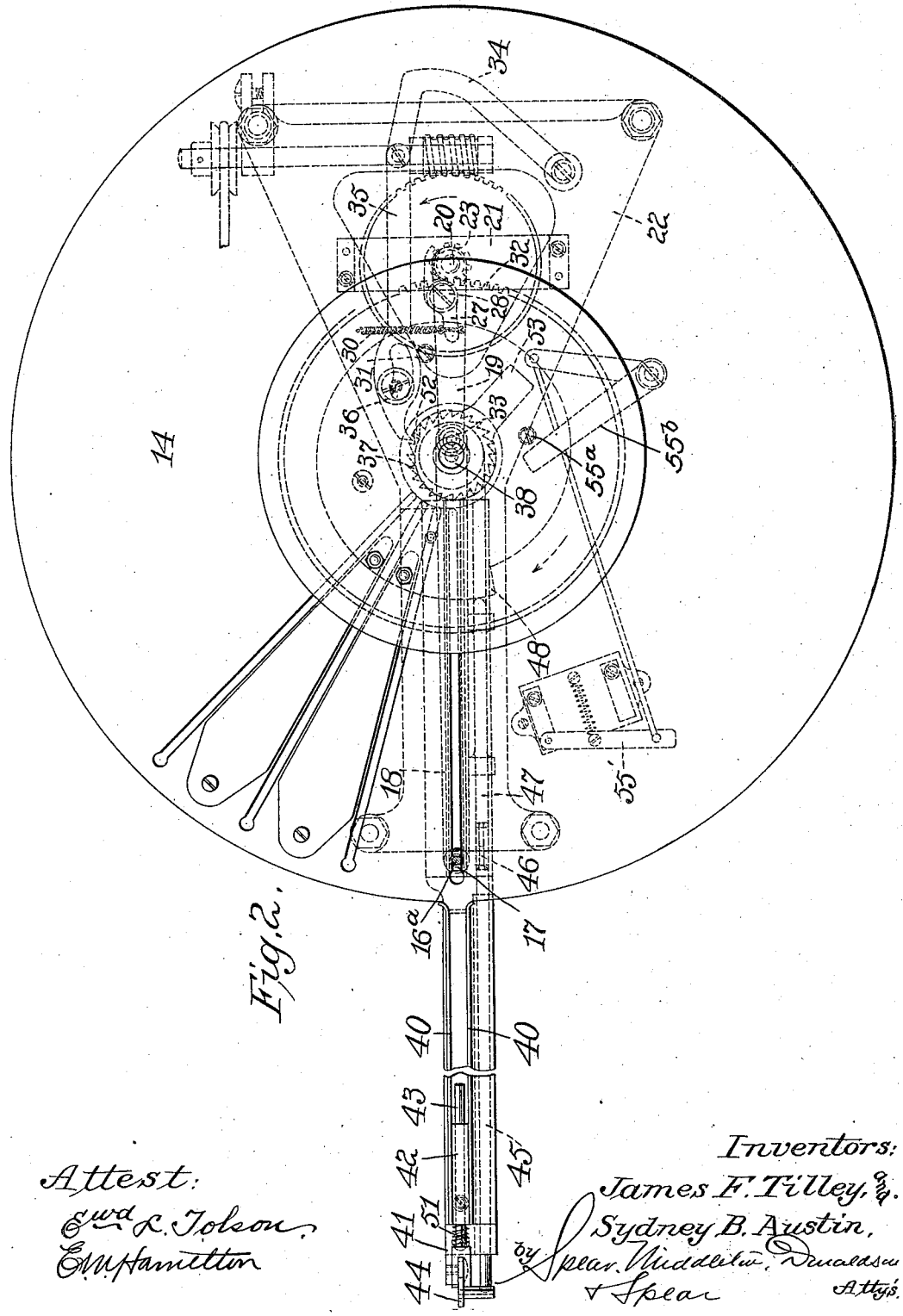

J. F. TILLEY & S. B. AUSTIN.
DISPLAY APPARATUS FOR PRODUCING MOTION PICTURE EFFECTS.
APPLICATION FILED FEB. 13, 1914.
1,178,461.
Patented Apr. 4, 1916.
4 SHEETS—SHEET 4.
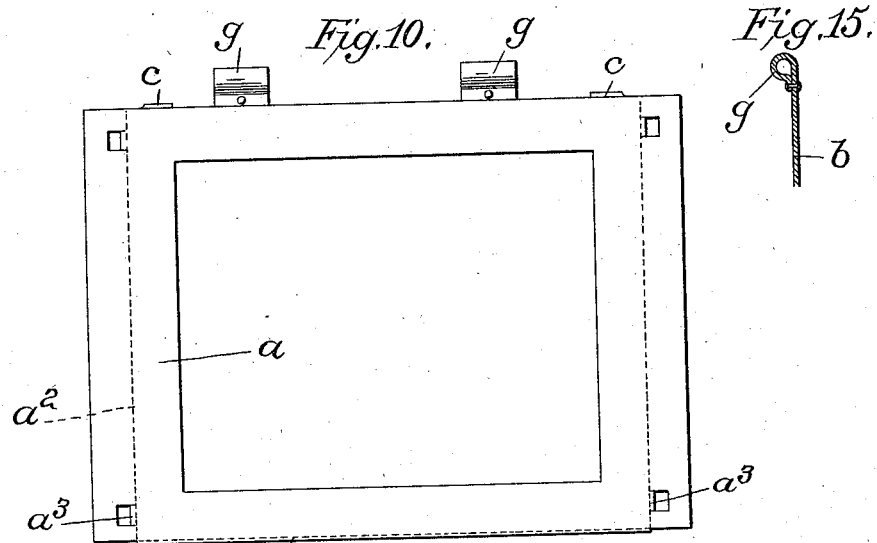
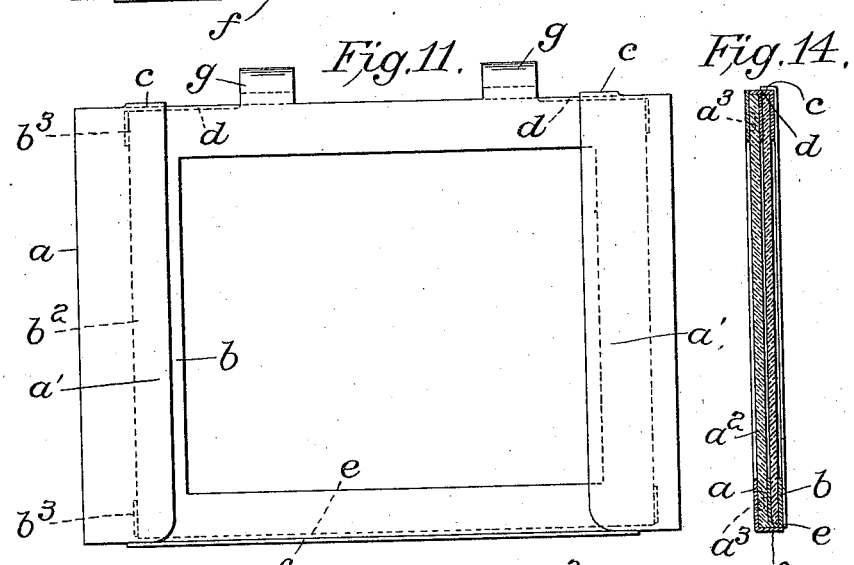
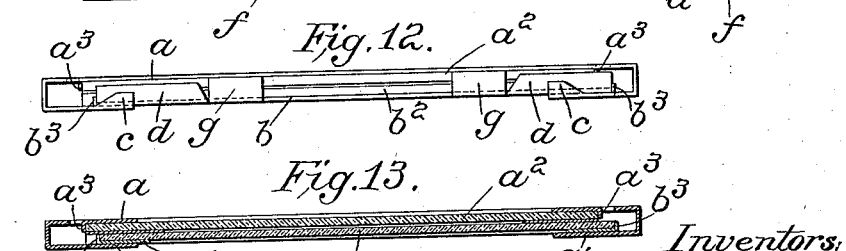
Inventors,
James F. Tilley,
Sydney B. Austin,
by Spear, Middleton, Donaldson & Spear
Attys.
Attest:
Edwd. L. Tolson
E. M. Hamilton

UNITED STATES PATENT OFFICE.

JAMES F. TILLEY, OF WASHINGTON, DISTRICT OF COLUMBIA, AND SYDNEY B. AUSTIN, OF BALTIMORE, MARYLAND, ASSIGNORS, BY MESNE ASSIGNMENTS, TO MOTTLE-GAIGE ANIMATED ADVERTISING CORPORATION, OF NEW YORK, N. Y.

DISPLAY APPARATUS FOR PRODUCING MOTION-PICTURE EFFECTS.

1,178,461. Specification of Letters Patent. Patented Apr. 4, 1916.

Application filed February 13, 1914. Serial No. 818,526.

*To all whom it may concern:*

Be it known that we, JAMES F. TILLEY and SYDNEY B. AUSTIN, citizens of the United States, residing at Washington, District of Columbia, and Baltimore, Maryland, respectively have invented certain new and useful Improvements in Display Apparatus for Producing Motion-Picture Effects, of which the following is a specification.

The object of this invention is to provide an apparatus for producing motion picture effects by the use of composite picture members and a screen or screens having lines and clear spaces through which latter the parts of the composite picture may be viewed or projected.

In the accompanying drawings, Figure 1 is a vertical sectional view of one form of apparatus embodying the invention. Fig. 2 is a plan view of Fig. 1. Fig. 3 is a detail view partly in section. Figs. 4 and 5 are detail views relating to a clutch lever. Fig. 6 is a side view showing a master screen with its operating means. Fig. 7 is a sectional plan view of Fig. 6. Fig. 8 is a plan view of a modified form of holder and operating means for the composite slide or for a picture slide. Fig. 9 is a side view in section of Fig. 8. Figs. 10 and 11 are side views of the composite slide. Fig. 12 a plan view. Fig. 13 a sectional view in plan. Fig. 14 a vertical sectional view, and Fig. 15 a detail. Fig. 16 is a detail view of a shield for controlling the length of the effective stroke of the operating pawl for the rotary carrier table.

The invention may be carried out in various ways, it being intended to display by an automatically operating machine a series of composite pictures carried by slides which are moved one after the other to and from the display point. These slides may each be composed of a transparent member having thereon a composite picture and a screen member having lines with clear spaces between, through which the different parts of the composite picture may be projected or viewed upon the proper operation of the slide, or the slides may be composed of a series of composite picture members and a master screen of the character above mentioned to which the composite picture members are moved by the machine and displayed to give the motion picture effects after which the said slides are moved away from the display point.

While the invention in some of its aspects may be carried out in machines of various forms, in the particular form illustrated a rotary table 14 is used which carries a series of radially arranged receptacles in its upper side for holding the slides, these slides being projected or moved radially outward when they are brought by the step by step movement of the table or carrier to a certain position so that by said radially outward movement the slides may be positioned in succession at the display point in front of the light or projecting apparatus as a lantern or stereopticon, such as is used in motion picture theaters. For moving the slides outwardly and inwardly radially of the carrier these slides are mounted on radially movable transferring carriages indicated at 16, each of said carriages having arms $16^x$ to engage the slides and having also a downwardly projecting roller or pin $16^a$ extending through radial slots in the table and adapted to engage a fork 17 movable radially of the main rotary carrier of the machine. This fork is open sided as shown in Fig. 3, so that the pin can pass into it and out of it. This fork operates in a fixed guideway extending radially beneath the main rotary platform or carrier 14 and it is reciprocated by a rod 18 connected with an arm 19 fixed on a vertical shaft 20 mounted in a fixed bracket or standard 21 on the main fixed frame 22 of the machine. Motion is imparted to the shaft 20 from a gear wheel 23 through a clutch 24 which is pressed upwardly by a spring 25, the clutch being splined to the shaft by a pin and slot connection 26. This clutch is controlled by a lever 27 pivoted to the frame at 28 and having a cam shaped curved end adapted to force the clutch downwardly by engaging a pin on said clutch as the same rotates, the cam lever for this purpose having its inclination on its under side as at 29. This controlling lever is in turn controlled by a spring 30 to hold it in position for engaging and moving the clutch downwardly; and for throwing the lever out of operation and thereby allowing the clutch to rise by its spring 25 into connection with the constantly rotating gear 23 a pin 31 is carried by a gear 32 driven from the gear 23. When this pin strikes the clutch lever it will retract the same away from the clutch and allow this to act and perform one revolution. The clutch controlling lever however, immediately returns to its controlling position as soon as the pin 31 passes away therefrom and thus the controlling lever is in position to release the clutch when one revolution has been performed.

In the drawing the arm 19 and link 18 are shown in the position assumed by them when the motion picture slide has been moved out radially to the display point. The slide is held in this position for a sufficient length of time to allow for the display thereof and during this time the main carrier 14 is at rest. When the arm 19 rotates upon the throwing in of the clutch it draws the picture slide radially inward and then the main table 14 rotates, carrying the pin 16$^a$ on the slide, which has just been displayed and drawn radially inward, out from engagement with the fork 17 and bringing the next slide into position with its pin engaging the fork 17, whereupon the rotary movement ceases the slide is projected radially outward, displayed and then retracted and these actions are repeated during the rotation of the machine, any desired number of slides being mounted thereon. The rotary movement of the carrier 14, which is step by step, takes place from a pin or roller 33 on the arm 19 working against an arm 34 pivotally mounted at one end to the fixed frame and having its other end connected with a slide 35 guided by a pin 36, said slide having its end formed as a pawl to engage teeth on a ratchet wheel 37 fixed on the shaft 38 mounted in the frame 39 and carrying the rotary platform or table 14. This rotary movement of the platform takes place during the final movement of the link 18 and arm 19 toward the right in the sectional view, Fig. 1, and during the time the roller 33 is passing over the dead center relative to the stroke of link 18 and the fork 17, and also during the time the link and fork are substantially at rest in the inward limit of their stroke so that because the fork is at rest the pin 16$^a$ on the used picture slide may leave the fork 17 and the pin 16$^a$ connected with the next slide will engage the said fork ready for the projection of this slide.

In order to give the motion picture effect to the slide when it is thrust out from the carrier to the display point various ways may be provided, but in the particular form of machine now being described said slide is received in a pocket or receptacle consisting of the upstanding sides 40 having openings in their walls through which the light from the lantern may pass. These sides are fixed to a post 41 which also has a guide 42 for a rod 43 and a lever 44 is pivoted to the post, the lower end of the lever being operated by a rod 45 from an arm 46 on a rod 47 operated from a cam 48 rotating with the gear 32. When the slide is in the receptacle 40 at the display point the rod 43 will be operated and by contacting with a part of or projection on one member of the composite slide, i. e. either the picture member or the screen member, said member will be moved relative to the other so that the different parts of the composite picture will be exposed through the clear spaces of the screen to give the motion picture effects. It will be noticed that the movement of the one part of the slide in relation to the other part takes place continuously in one direction in displaying a complete motion picture or in exhibiting all the different component parts which the slide contains, and this is in contradistinction of an arrangement for giving one member a movement back and forth in relation to the other member during the production of the motion picture effect and gives the advantage that there is no dwell in the movement or in the changes of the picture which is liable to be the case at the end of a reciprocating stroke in one direction.

When the slide is drawn back onto the rotary table the member of the slide which was moved, as just described by the rod 43, is returned to its former position by a projection thereon striking a rim 49 on the post 50. The pin 43 with its operating connection is returned to position for receiving another slide by a spring 51.

The composite slides which we have been referring to consist of two metal frames $a$, $b$, one carrying the transparent picture member and the other the transparent screen member, these frames being slidable one on the other for displacing the screen and composite picture member relative to each other. The outside frame $a$ has portions $a'$ overlapping the inner frame $b$. The transparent member $a^2$ is held to the outer member against displacement by lugs $a^3$ struck out from the frame and bent across the edge of the glass member. The other transparent member $b^2$ is held by lugs $b^3$ on the inner sliding member $b$, these lugs extending over the edge of said member. The two frames with their transparent members are held against vertical displacement by the lugs and flanges $c$, $d$, and $e$, $f$, but these permit the inner frame with its transparent member to slide lengthwise of the outer frame and its transparent member to present different parts of the composite picture to the clear spaces between the lines of the screen. This construction provides an inclosing frame for the glass or transparent members protecting them in use and enabling one to be guided accurately in relation to the other.

$g$ indicates projections formed of integral tongues on the inner frame with which the operating device may act to operate the slide. Instead however, of having a separate screen member for each composite picture member, a master screen may be used and this may be mounted on the pin 43 to move therewith and the picture members may be brought to this screen in a manner similar to that above described by the sliding carriages and moved back into position on the rotary carrier by the same means. One of the upstanding sides 40 of the receptacle would remain while the screen member would constitute the other side of this receptacle. This modification is shown in Figs. 6 and 7.

In order to adjust the machine so that during one revolution of the rotary table a less number of slides will be exposed than the machine is capable of holding, means are provided to give the table different lengths of rotary steps so that either a larger or a smaller series of slides may be exhibited, the intervals between the displaying actions for any given number of slides being uniform. Thus the carrier may be given a step long enough to expose every slide or the step movement may be lengthened to expose every other slide. For this purpose a shield 52 is provided, mounted to turn about the axis of the ratchet wheel 37 and having a portion to guard the teeth of the ratchet wheel from the action of the pawl so that the rotary carrier may move 1/24th of a revolution at each step, of 1/12th or 1/8th of a revolution. This shield has a tail piece 53 by which the shield may be set in either of its positions.

In order to give the motion picture effect the picture slide with its lined screen may be oscillated or swung into an inclined relation to the line of vision or the line of projected light instead of reciprocating one part of the slide in relation to the other as above described, and for this purpose a trough or receiver is used pivotally mounted at 53' to a fixed part of the frame, said trough having upstanding sides to receive the picture slides between them when they are projected radially outward in succession from the rotary main table 14. This trough has its sides provided with openings through which the light may pass to display the picture on the slide and when the picture slide is in place the trough is given a swinging movement about the pivot 53'; and in order to do this the outer end of the trough is connected to a bell crank lever 54 suitably mounted on the frame part of the machine, said bell crank lever being operated from a cam 55 by a link 56, a spring 57 operating the parts in one direction. This mechanism is timed to swing the trough with its contained picture slide when the slide is positioned therein. By this swinging movement different parts of the composite picture are visible or at different times exposed through the clear spaces according to the angular positions assumed by the slide in relation to the line of light.

The invention also consists in having in this form of apparatus a permanent screen member, common to all the picture slides instead of having a lined screen member associated with each picture, and while this may be arranged in various ways in the particular form now being described it is carried by the trough and mounted in or upon one of the upstanding sides thereof, and the slides which are mounted upon and carried by the platform 14 in this instance would be picture slides only and these would be brought to and handled in substantially the same way as the composite slides referred to in the foregoing description of the present form of the machine. In other words, these picture slides would be projected outwardly into the trough and into proper relation with the permanently located lined screen mounted in the trough, and then by oscillating or swinging the trough with its permanent lined screen and the picture member located in the trough the same effect will be produced as above described. It will be understood that the projecting apparatus or light remains in line with the opening through the sides of the trough. In the form of machine just described having the trough or receptacle pivoted at 53', this pivot is axially in line with the projection $16^a$ which extends down from the bottom of the slide, the said pivot being hollow and open on one side to receive the pin $16^a$. The pivoted trough or the connections described may be termed oscillator means and is representative of any device which will secure a swinging movement of a slide at the display point to get the moving picture effect and whether a composite slide is used, having each a screen, or whether a master screen is used. It will be understood however, that the motion picture effect may be secured during the time that the oscillating means is moving continuously in one direction.

The picture slides are detachably held by the carriages 16 and these carriages can be removed from the carrier 14 by moving them outward until their pins 16ᵃ register with the enlarged openings at the ends of the radial slots in the carrier table 14, whereupon the carriages 16 may be lifted from the carrier 14.

Where in the appended claims reference is made to moving a composite picture member to the display point, these terms are used in a generic sense whether the composite picture member has its own line screen transported therewith or the composite picture member is moved to the display point at which a master lined screen is situated.

Either the screen member is moved in relation to the picture carrying member or the reverse may be done, i. e. the picture member may be moved relatively to the screen member, or both may be moved relative to the display light or apparatus and the screen may be a master screen or a screen may be used individually with each picture member; and therefore, where in the appended claims we refer to presenting different parts of the picture member for display through the clear spaces of the screen, we use these terms in a generic sense to include any of the above ways or their equivalents. Means are provided for cutting off the light when the movable part or parts of the display device are being returned to normal position. For this purpose a knife switch 55′ controlling the circuit to the lamp is operated by a spring and by a pin 55ᵃ on the cam 48, said pin operating a lever 55ᵇ. While the movement for presenting different parts of the picture member for display through the clear spaces of the screen means is taking place continuously in one direction the light is on, but when the reverse movement takes place the light is off.

The invention in some of its aspects may be carried out in connection with what may be termed a single slide machine, i. e. where the slides are placed in and removed from position at the display point by hand and when in position are automatically operated to produce the motion picture effects by means adjacent the display point.

We claim as our invention:

1. In combination in apparatus of the class described, a series of composite picture members, a rotary carrier therefor, screen means having opaque portions and clear spaces coöperating with the picture members to display different parts of said composite pictures through the clear spaces of the screen, means for moving the rotary carrier step by step, means for moving the picture members outwardly and inwardly of the carrier to and from the display point, and means for presenting different parts of the composite picture for display through the clear spaces of the screen means when at the display point, substantially as described.

2. In combination in apparatus of the class described, a series of composite picture members, a rotary carrier therefor, screen means having opaque portions and clear spaces coöperating with the picture members to display different parts of the said composite pictures through the clear spaces of the screen, means for rotating the carrier step by step, means for moving the picture members in a general direction radially of the carrier to and from the display point, and means automatically operating adjacent the display point for presenting different parts of the composite picture for display through the clear spaces of the screen, substantially as described.

3. In combination in apparatus of the class described, a series of composite picture members, and screen means having opaque portions and clear spaces coöperating with the picture members to produce motion picture effects, a rotary carrier, means for operating it step by step, transporting means operating radially of the carrier and engaged by the picture members in succession as the carrier rotates, said transporting means acting to move the composite picture members radially outward to the line of light, and means for presenting different parts of the composite picture members to the clear spaces of the screen when the composite picture members are moved outward on the carrier to thereby produce the motion picture effects.

4. In combination a rotary step by step carrier, composite picture members carried thereby, screen means having opaque portions and clear spaces, means for moving the composite picture members in a general direction radially of the carrier to and from a display point and means for effecting a relative reciprocating movement between the screen means and the composite picture members at the display point, substantially as described.

5. In combination a rotary step by step carrier, composite picture members carried thereby, screen means having opaque portions and clear spaces, means for moving the composite picture members in a general direction radially of the carrier to and from a display point and means for effecting a relative reciprocating movement between the screen means and the composite picture members at the display point, and a rotary member for operating the reciprocating means, substantially as described.

6. In combination a rotary carrier, a series of composite picture members, screen means, means for rotating the carrier, means for moving the composite picture members radially off from the carrier to the display point and back again, and display controlling means for securing a relative movement between the screen means and composite picture member at the display point, said means operating in a general direction coinciding with the radius of the carrier, and timing means for determining the relative actions of said rotating carrier and said display controlling means, substantially as described.

7. In combination a rotary step by step carrier, composite motion picture slides comprising each a composite picture member and a screen member, means for shifting the slides on the carrier to and from a display point, and automatic means for operating the slides when at the display point to produce the motion picture effects.

8. In combination a rotary step by step carrier, screen means having lines and spaces, picture members to be displayed through the screen means and carried by the rotary carrier, means for rotating the carrier to carry the picture members, transporting means for moving the picture members to the display point, and means for automatically presenting different parts of the picture for display through the clear spaces of the screen means at the display point.

9. In combination a rotary step by step carrier, picture slides mounted thereon, means for moving the slides on the carrier to and from the display point including a revolving arm with a connection leading therefrom to be engaged by and disengaged from the picture slides by the rotary movement of the carrier, and means operated from said revolving arm for moving the carrier step by step.

10. In combination a rotary step by step carrier, picture slides mounted thereon, means for moving the slides on the carrier to and from the display point including a revolving arm with a connection leading therefrom to be engaged by and disengaged from the picture slides by the rotary movement of the carrier, and means operated from said revolving arm for moving the carrier step by step, said means comprising ratchet means connected with the carrier and a pawl to engage the ratchet means and a pawl operating means actuated from said revolving arm, substantially as described.

11. In combination in a picture slide display apparatus, a rotary carrier for the slides, means for holding the slides on the carrier to allow radial movement of said slides, a crank arm with connection adapted to be operated thereby and with which the slides engage and disengage, as the rotary carrier moves, for shifting the slides radially of the carrier, means operated by the crank arm for rotating the carrier, a clutch controlling the operation of said crank arm, and timing means controlling the operation of the clutch.

12. In combination a rotary carrier, lantern slides carried thereby, each composed of a screen member and a composite picture carrying member relatively movable, means for shifting the lantern slides radially of said carrier to and from a display point, means for effecting said relative movement of the lantern slide members, in one direction when at the display point and means for restoring said members to normal position when moved away from said display point, substantially as described.

13. In combination in a display apparatus, a plurality of lantern slides, each composed of a screen member and a composite picture member relatively movable, means for moving the slides to and from the display point, means for moving one member of each slide continuously in one direction in relation to the other when at the display point, and means for moving said members back to normal relation to each other when the slide is removed from said display point.

14. In combination a rotary carrier, lantern slides movable thereon, each composed of a screen member and a composite picture carrying member relatively movable, means for shifting the lantern slides radially of said carrier to and from a display point, means for effecting said relative movement of said slide members in one direction when at the display point, and means for restoring said members to normal position when moved away from the display point, said restoring means consisting of a member to contact with one of the slide members as the said slide is approaching the center of the rotary carrier.

15. In combination in a lantern slide display apparatus, a plurality of lantern slides, a horizontal rotary carrier having radial slots, means for holding the slides removably on the upper side of said carrier, a device below the carrier, said slides each having a member passing through the radial slots to engage with or disengage from the said device as the carrier rotates, means for moving said device radially to project or withdraw the slide engaged therewith, substantially as described.

16. In combination in a lantern slide display apparatus, a plurality of lantern slides, a horizontal rotary carrier having radial slots, means for holding the slides removably on the upper side of said carrier, a device below the carrier, said slides each having a member passing through the radial slots to engage with or disengage from the said device as the carrier rotates, means for moving said device radially to project or withdraw the slide engaged therewith, the said means including a crank arm below the carrier with a connection to the said device, substantially as described.

17. In combination, screen means, composite picture slides, said slides and screen means having relative movement at the display point to display different parts of the composite picture through the clear spaces of the screen means, a horizontally radially slotted carrier having the picture slides on its upper side and removable therefrom, said slides each having a portion passing through the radial slots, a device on the underside of the carrier to be engaged by or disengaged from the said portion as the carrier rotates, a crank arm below the carrier for operating the said device to project or withdraw the slide engaged therewith, means for rotating the carrier step by step, a timing gear controlling the said crank arm and the rotating means, means at the display point for operating the slide and a connection from said means to the timing gear to be operated thereby, substantially as described.

18. In combination in apparatus for producing motion picture effects, composite picture members, screen means having opaque portions with clear spaces between, mechanism for transporting to a display point the members to be displayed, mechanism for presenting different parts of the composite picture members to the clear spaces of the screen, and timing mechanism for determining the relative actions of the transporting mechanism and the displaying mechanism, substantially as described.

19. In combination in apparatus for producing motion picture effects, composite picture slides, screen means having opaque portions with clear spaces between, transporting mechanism, displaying mechanism for presenting different parts of the composite picture slides to the clear spaces of the screen when at the display point, timing mechanism for determining the relative actions of the transporting mechanism and the display mechanism, said transporting mechanism and display mechanism being interconnected by said timing mechanism, substantially as described.

20. In combination in a lantern slide display apparatus, a series of lantern slides each composed of a holder having a screen member and a composite picture member carried thereby, one movable in relation to the other in said holder, means for moving the slides edgewise to and from the display point, means for moving the movable member of the slide in one direction, and means for restoring the movable member to normal position, said last-mentioned means being rendered effective by the edgewise movement of the slide away from the display point, substantially as described.

21. In combination in a lantern slide display apparatus, a series of lantern slides each comprising a holder having a screen member and a composite picture member carried thereby, one movable in relation to the other in said holder, means for moving the slides edgewise to and from the display point, means adjacent said display point for moving the movable member of the slide in one direction, and restoring means located in the path of the slide when moved edgewise away from the display point to contact with the movable member and restore the same to normal position during said movement of the slide away from the display point, substantially as described.

22. In combination in a lantern slide display apparatus, a series of lantern slides each comprising a holder having a screen member and a composite picture member carried thereby, one movable in relation to the other in said holder, means for moving the slides edgewise to and from the display point, means adjacent said display point for moving the movable member of the slide in one direction, and restoring means located in the path of the slide when moved edgewise away from the display point to contact with the movable member and restore the same to normal position during said movement of the slide away from the display point, said means being fixed, substantially as described.

23. In combination in a lantern slide, display apparatus, a series of slides each composed of a holder and a transparent screen member and a transparent composite picture member therein, one movable in relation to the other, means for transporting said slides to and from the display point, and means for sliding the movable member in relation to the other member comprising a device for pushing it in one direction and a second device for pushing it in the opposite direction, substantially as described.

24. In combination in a display apparatus, a series of slides each composed of a holder and a transparent screen member and a transparent composite picture member therein, one movable in relation to the other, a carrier for said slides, means for transporting the slides on said carrier to the display point, means for pushing the movable member of the slide, when at the display point, in relation to the other member, means for operating the carrier and means on the carrier for restoring said movable member to normal position, substantially as described.

25. In combination in a display apparatus, a series of slides each composed of a holder and a transparent screen member and a transparent composite picture member therein, one movable in relation to the other, a rotary carrier for said slides, means for transporting the slides along said carrier to the display point, means for pushing the movable member of the slide, when at the display point, in relation to the other member, means for operating the carrier and means on the rotary carrier for restoring said movable member to normal position, said means consisting of a member at the center of the carrier against the rim of which the movable members of the slides contact, substantially as described.

26. A display apparatus comprising screen means having opaque portions with clear spaces between them, composite picture members, rotary carrier means for the composite picture slides, means for moving the slides radially of the carrier to and from the display point, means for presenting different parts of the composite picture members, when at the display point, for display through the clear spaces of the screen, means for rotating the carrier step by step, and timing means including a rotating member for determining the relative times of operation of the rotary carrier, the means for radially moving the slides and the said presenting means, substantially as described.

27. In combination in a display apparatus, screen means having opaque portions with clear spaces between, composite picture members, a step by step rotary carrier, means for operating the carrier, reciprocating means for moving the composite picture members radially of the carrier to the display point, and for returning the same, said means including an intermittently operating crank arm, a clutch controlling the rotation of the crank arm, gearing coaxially arranged with said crank arm and clutch for rotating said clutch, a lever controlling the engagement of the clutch and gearing, a timing gear meshing with said gearing and having means for operating the clutch lever, means for presenting different parts of the composite picture member, when at the display point, for display through the clear spaces of the screen, a cam rotating in unison with the timing gear, and connections between said cam and the said presenting means, substantially as described.

28. In combination a series of lantern slides, a step by step carrier therefor, means for operating the carrier, said carrier being slotted, a projection for each slide connected therewith and extending through one of the slots, a fork-shaped member adjacent the carrier to receive one of the projections when the carrier comes to rest, and means for reciprocating the fork-shaped member to project and return the slide to normal position, the said projection passing out of connection with the fork and the projection of the next following slide being moved into engagement with the said fork when the carrier makes its next step movement, substantially as described.

29. In combination a series of slides, each having a projection connected thereto, a carrier for the slides having slots through which said projections extend, means for operating the carrier, said slots having enlarged openings at their ends to permit the withdrawal of said projections with the slides and reciprocating means for the slides adjacent the carrier with which said projections are engaged and disengaged by the movement of the carrier, substantially as described.

30. A display apparatus comprising screen means having opaque portions with clear spaces between them, composite picture members, a fixed support for holding said screen means and picture members, said support engaging the said picture members from below and permitting removal and replacing of the same thereon, means adjacent said fixed support for giving a relative movement to the picture members and the screen means while held by said support, and transporting means for bringing picture members to and removing them from said support automatically, substantially as described.

31. In combination in apparatus of the class described, a series of composite picture members and screen members having opaque portions and clear spaces, and coöperating with the picture members to provide motion picture effects, a step by step moving carrier with means for operating the same, transporting means operating at an angle to the line of travel given to the members moved by the carrier, and engaged in succcession by the said members as the carrier moves step by step, said transporting means operating to move the members outward from the carrier to the line of light, and means for presenting different parts of the composite picture members to the clear spaces of the screen when the said members are moved outward in relation to the carrier to thereby produce the motion picture effects.

32. In apparatus of the class described, a series of composite picture members, screen means for displaying the different components of the composite picture at different times according to the relative adjustment of the composite picture member and screen means at the display point, a carrier for the series of composite picture members, means for moving the carrier step by step to bring the composite pictures in position to be moved to the display point, means for moving the composite picture members to the display point and for restoring them to position on the carrier while said carrier is at rest, and means for relatively moving the screen means and composite picture members when the latter are at the display point, substantially as described.

In testimony whereof we affix our signatures in presence of two witnesses.

JAMES F. TILLEY.
SYDNEY B. AUSTIN.

Witnesses:
 WALTER DONALDSON,
 H. M. BARRETT.

Copies of this patent may be obtained for five cents each, by addressing the "Commissioner of Patents, Washington, D. C."